(12) United States Patent
Matsuoka

(10) Patent No.: US 7,688,367 B2
(45) Date of Patent: Mar. 30, 2010

(54) IMAGE SIGNAL PROCESSING APPARATUS AND IMAGE SIGNAL PROCESSING METHOD

(75) Inventor: Masaaki Matsuoka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 941 days.

(21) Appl. No.: 11/432,820

(22) Filed: May 11, 2006

(65) Prior Publication Data
US 2006/0262207 A1    Nov. 23, 2006

(30) Foreign Application Priority Data
May 17, 2005 (JP) ............................. 2005-144344

(51) Int. Cl.
*H04N 9/64* (2006.01)
*H04N 5/217* (2006.01)

(52) U.S. Cl. ...................................... 348/243; 348/241
(58) Field of Classification Search .................. 348/243
See application file for complete search history.

(56) References Cited

U.S. PATENT DOCUMENTS 6,721,009 B1 * 4/2004 Iizuka ......................... 348/314
6,791,607 B1 * 9/2004 Bilhan et al. ................. 348/243
6,900,837 B2 * 5/2005 Muramatsu et al. .......... 348/243
2004/0095487 A1 * 5/2004 Sato ............................ 348/243

FOREIGN PATENT DOCUMENTS

JP    2004-266750    9/2004

* cited by examiner

*Primary Examiner*—Lin Ye
*Assistant Examiner*—Amy Hsu
(74) *Attorney, Agent, or Firm*—Canon U.S.A. Inc., I.P. Division

(57) ABSTRACT

An image processing device has an image sensing device, an optical black (OB) level detection unit that measures an OB level from an OB area in an image signal output by the image sensing device, an OB correction unit that corrects an OB level of an image signal output after the OB area, and a mode changeover unit that controls switching between a first mode that outputs an image signal of predetermined pixels and a second mode that outputs an image signal from fewer pixels than the predetermined pixels. The OB level detection unit measures the OB level from an image signal output during the second mode, and the OB level correction unit calculates an optical black level for the first mode from the measured optical black level, based on image sensing conditions to be used in the first mode, and corrects the optical black level during the first mode.

4 Claims, 13 Drawing Sheets

IMAGE SIGNAL PROCESSING APPARATUS AND IMAGE SIGNAL PROCESSING METHOD

FIELD OF THE INVENTION

The present invention relates to an image signal processing apparatus and image signal processing method capable of performing optical black correction.

BACKGROUND OF THE INVENTION

In an ordinary image sensing apparatus having a lens system and an image sensing element, there is a risk of such obstacles as, for example, shading of an image to be sensed due to a drop in marginal lumination caused by the lens system. To counteract this effect, the lens system is designed using multiple lenses, for example, to prevent the occurrence of such obstacles. However, such multi-lens lens systems are expensive, and moreover, in most cases are difficult to use in compact cameras and the like.

By contrast, where signal intake is carried out according to XY coordinates as with an instrument that uses a semiconductor image sensing element, for example, the image can be corrected by digital processing of the image signal. Consequently, conventionally, techniques of digitally correcting distortion due to image sensing with an inexpensive lens system, or of such lens shading as a drop in marginal lumination and color migration, are proposed. For example, in JP-A-2004-266750, a correction technique like the following is proposed: In general, it can be thought that the lens shading is a function of the distance from the lens system optical axis to correction pixels. Therefore, in order to correct lens shading, first, a distance d from the lens system optical axis to the pixel to be corrected is calculated using Pythagoras's theorem $d=\sqrt{x^2+y^2}$. Then, a shading coefficient that is a function of the distance from the lens system optical axis to the pixel to be corrected is applied to each of the pixels to be corrected, thereby implementing the correction.

When applying this type of shading correction, usually noise caused by dark current and the like of the pixels is corrected first, so as not to over-correct the noise by shading correction.

In addition, in a white point detection process for the purpose of WB (white balance) correction as well, detection cannot be done correctly if noise is present, and therefor, usually, the pixel noise is corrected first.

As a result, a method that corrects noise by measuring the OB level and subtracting the OB level from the values of the pixels (hereinafter called "OB correction") is taken as the usual method of correcting noise. With this method, in a monitor mode that continuously reads field images while sampling pixels from the image sensing element for confirming the subject and processes the image signal (an electronic viewfinder display mode; hereinafter referred to as "EVF display mode"), the OB level measurement results of the immediately preceding field image are used to correct the OB level difference of the current field image as shown in FIG. 13. In addition, in a "still image sensing mode (main image)" that reads all the pixels from the image sensing element in single shot or a continuous shot for recording an image or images and processes the image signals, first, the OB level is measured when the image signal is read from the image sensing element as shown in FIG. 13. Then, the image signal is temporarily held in memory, and the OB level is subtracted when the image signal is read from the memory.

However, when the image signal is temporarily held in the memory and then read again for OB correction in the still image sensing mode as described above, the interval to the next image sensing lengthens, leading to user stress and lost image-sensing opportunities as a result.

SUMMARY OF THE INVENTION

The present invention has been made in light of the above-described situation, and has as its object to make it possible to carry out optical black correction without temporarily storing the image signal in the memory, shortening the interval to the next image sensing.

According to the present invention, the foregoing object is attained by providing an image signal processing apparatus comprising:

an image sensing device that outputs an image signal of an object;

an optical black level detection unit that measures an optical black level from an image signal from an optical black area in the image signal output by the image sensing device;

an optical black correction unit that corrects an optical black level of the image signal output from the image sensing device after the image signal from the optical black area is output, based on the optical black level measured by the optical black level detection unit; and a mode changeover unit that controls switching between a first mode that outputs an image signal of predetermined pixels of the image sensing device and a second mode that outputs an image signal from fewer pixels than the predetermined pixels of the image sensing device, wherein the optical black level detection unit measures the optical black level from the image signal output from the image sensing device during the second mode, and the optical black correction unit calculates an optical black level for the first mode from the optical black level measured by the optical black level detection unit, based on image sensing conditions to be used in the first mode, and corrects the optical black level of the image signal output by the image sensing device during the first mode based on the calculated optical black level for the first mode.

According to the present invention, the foregoing object is also attained by providing an image signal processing apparatus comprising:

an image sensing device that outputs an image signal of an object;

an optical black level detection unit that measures an optical black level from an image signal from an optical black area in the image signal output by the image sensing device;

an optical black correction unit that corrects an optical black level of the image signal output from the image sensing device after the image signal from the optical black area is output, based on the optical black level measured by the optical black level detection unit; and a mode changeover unit that controls switching between a first mode that outputs an image signal of predetermined pixels of the image sensing device and a second mode that outputs an image signal from fewer pixels than the predetermined pixels of the image sensing device, wherein the optical black level detection unit measures the optical black level from the image signal output from the image sensing device during the second mode under image sensing conditions to be used in the first mode, and the optical black correction unit corrects the optical black level of the image signal output by the image sensing device during the first mode based on the measured optical black level.

According to the present invention, the foregoing object is also attained by providing an image signal processing method for processing an image signal of an image of an object output from an image sensing device, comprising:

receiving a mode changeover instruction to switch between a first mode that outputs an image signal of predetermined pixels of the image sensing device and a second mode that outputs an image signal from fewer pixels than the predetermined pixels of the image sensing device;

measuring an optical black level from an image signal from an optical black area in the image signal output by the image sensing device in the second mode prior to switching from the second mode to the first mode;

calculating the optical black level for the first mode from the measured optical black level based on image sensing conditions to be used in the first mode; and correcting the calculated optical black level for an image signal obtained from the image sensing device in the first mode after switching from the second mode to the first mode.

According to the present invention, the foregoing object is also attained by providing an image signal processing method for processing an image signal of an image of an object output from an image sensing device, comprising:

receiving a mode changeover instruction to switch between a first mode that outputs an image signal of predetermined pixels of the image sensing device and a second mode that outputs an image signal from fewer pixels than the predetermined pixels of the image sensing device;

measuring an optical black level from an image signal from an optical black area in the image signal output by the image sensing device during the second mode under image sensing conditions to be used in the first mode prior to switching from the second mode to the first mode; and correcting, based on the measured optical black level, an optical black level of an image signal output by the image sensing device in the first mode after switching from the second mode to the first mode.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
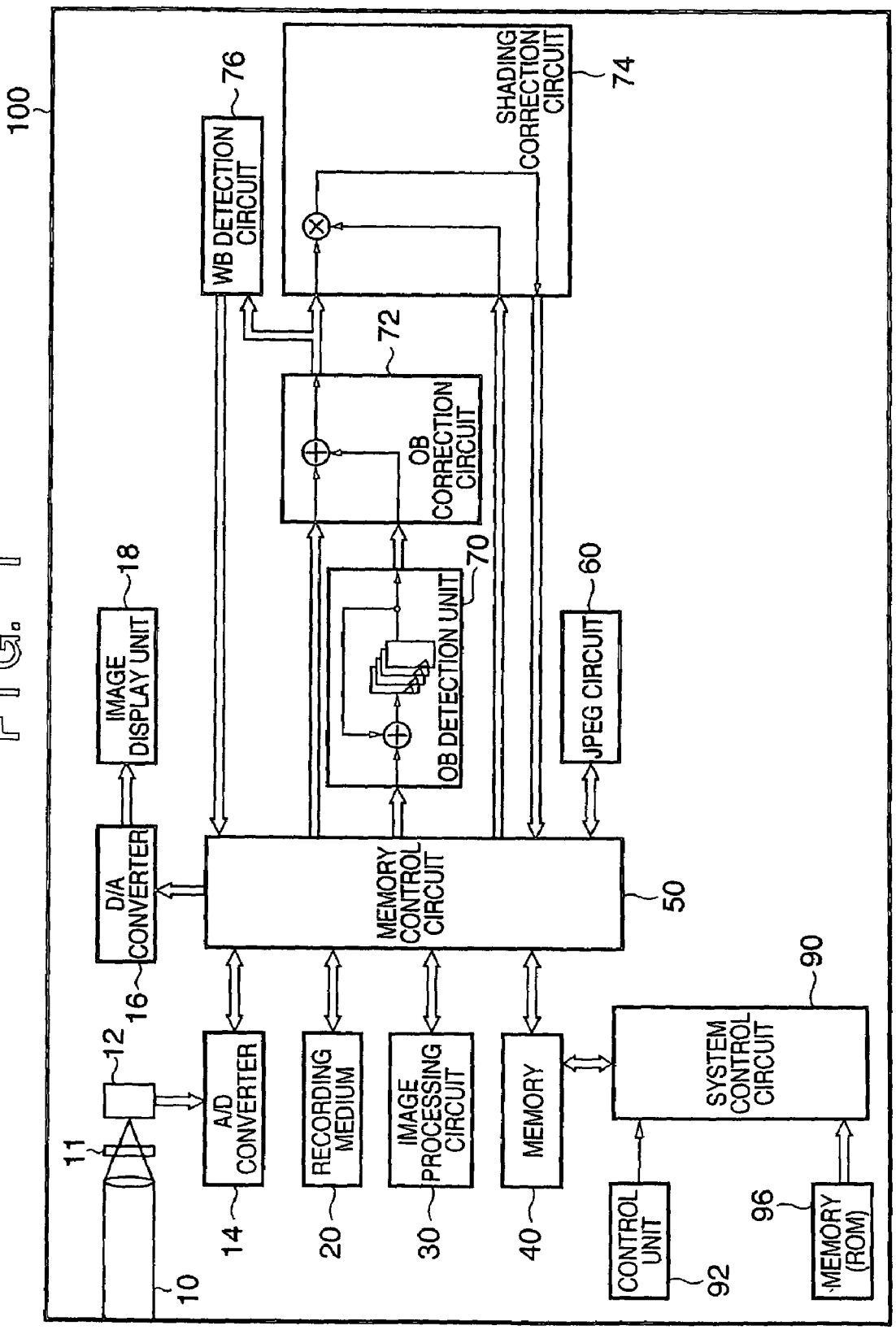
FIG. 1 is a schematic block diagram illustrating an image signal processing apparatus according to an embodiment of the present invention.

FIG. 1 is a schematic block diagram illustrating an image signal processing apparatus according to an embodiment of the present invention. In FIG. 1, reference numeral 100 designates an image signal processing apparatus. It should be noted that an electronic camera or the like can be given as one example of an image signal processing apparatus.

Reference numeral 10 designates an image sensing lens that optically focuses an image to be sensed, 11 designates a shutter that adjusts exposure of the image to be sensed, 12 designates an image sensing element that converts the image into an analog electrical signal, and 14 designates an A/D converter that converts the analog signal output of the image sensing element 12 into a digital signal. Here, the digital data output from the A/D converter 14 is hereinafter called CCD-RAW data.

Reference numeral 16 designates a D/A converter and 18 designates an image display unit composed of a TFT LCD or the like. Image data for display written to a memory 40 is converted from digital data to analog data through the D/A converter 16 and displayed by the image display unit 18. In addition, continuously reading image signals from the image sensing element 12 and successively displaying the signals on the image display unit 18 provides an electronic viewfinder capability.

Reference numeral 20 designates a recording medium such as a memory card or a hard disk, on which sensed image data and the like is recorded.

Reference numeral 30 designates an image processing circuit, which performs WB correction and such developmental processing as predetermined pixel interpolation, color conversion, and resizing on CCD-RAW data to be sensed or on recorded CCD-RAW data.

Reference numeral 40 designates the memory for developing data from a ROM 96 and for temporarily storing sensed image data, provided with sufficient storage capacity to store a predetermined number of frames of still images or a predetermined length of time of moving images. For example, digital data of an image output from the A/D-converter 14 is written into the memory 40 via a memory control circuit 50, the image processing circuit 30 and a JPEG circuit 60 or directly through the memory control circuit 50.

Reference numeral 50 designates the memory control circuit, which controls the data flow to the A/D converter 14, the D/A converter 16, the recording medium 20, the image processing circuit 30, the memory 40, the JPEG circuit 60, an OB detection circuit 70, an OB correction circuit 72, a shading correction circuit 74 and a WB detection circuit 76.

Reference numeral 60 designates the JPEG circuit that compresses and expands the image data using baseline JPEG.

Reference numeral 70 designates the OB detection circuit that measures the OB (optical black) level. The OB detection circuit 70 measures the OB level for each of R (red), G (green) and B (blue) colors, for instance, depending on the color filter arrangement of the image sensing element 12.

Reference numeral 72 designates the OB correction circuit that performs OB correction by clamping the OB level measured by the OB detection circuit 70 from the image signal.

Reference numeral 74 designates the shading correction circuit, which multiplies the image signal by a shading correction-coefficient corresponding to the distance from the optical axis. In addition, the present invention is not limited to such an arrangement, and alternatively, for example, the image signal processing apparatus may be constructed so that the image signal is multiplied by a shading correction coefficient corresponding to the horizontal coordinate or by a shading correction coefficient corresponding to the vertical coordinate, or multiplied by shading correction coefficients corresponding to two-dimensional coordinates.

Reference numeral 76 designates the WB (white balance) control circuit. Reference numeral 90 indicates a system control circuit that carries out operating control of the image sensing apparatus 100 as a whole and of the circuits that comprise the image sensing apparatus 100, according to either the settings of, e.g., a mode dial switch of a control unit 92 or the contents stored in the ROM 96 (read-only memory).

Reference numeral 92 designates the control unit, capable of switching and setting functional modes, for example, power off, image sensing mode, playback mode and the like. Reference numeral 96 designates the read-only memory (ROM), in which programs used by the system control circuit 50 and shading correction coefficients used by the shading correction circuit 74 are stored in advance.

A description will now be given of the operation of an image signal processing apparatus of a first embodiment of the present invention using FIGS. 2-6.

Figure 3:
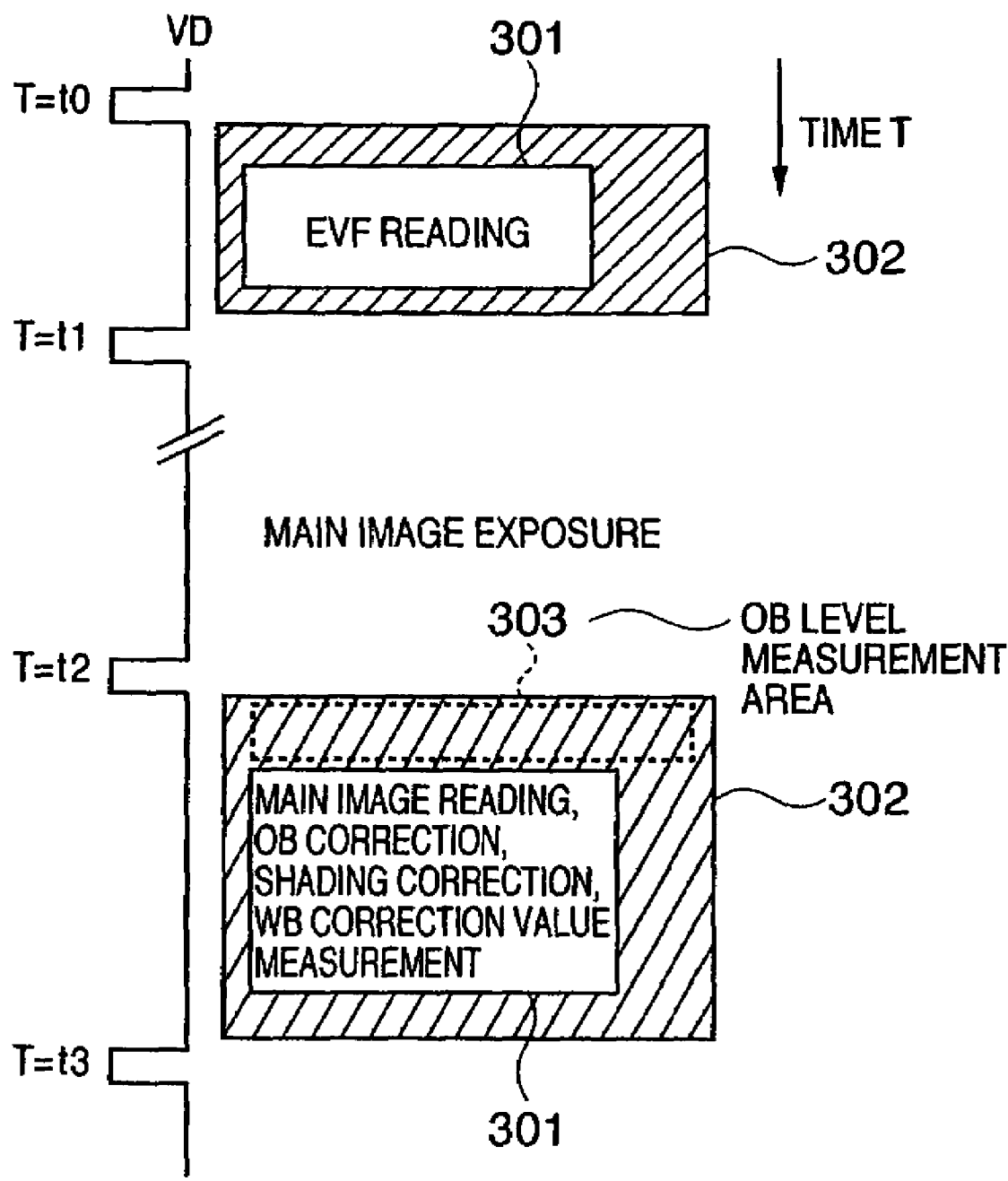
FIG. 3 is a schematic diagram for illustrating the sensor reading operation of the image signal processing apparatus according to the first embodiment of the present invention.

FIG. 3 illustrates an exposed area and an OB area of a signal read from the image sensing element 12, and a shift from an EVF display (EVF reading) to a main image reading. With EVF reading, the apparatus is driven so that an image signal from relatively few pixels selected as suitable for the image display unit 18 are read. With main image reading, the apparatus is driven so that an image signal is read from all or comparatively many of the pixels of the image sensing element 12. In the diagram, a rectangle 301 is the exposed area and an area 302 of slanted lines around the rectangle 301 is the OB area. VD is a vertical sync timing signal. The OB level of the main image is measured from the area of dashed-line rectangle 303 by the OB detection circuit 70.

Figure 4:
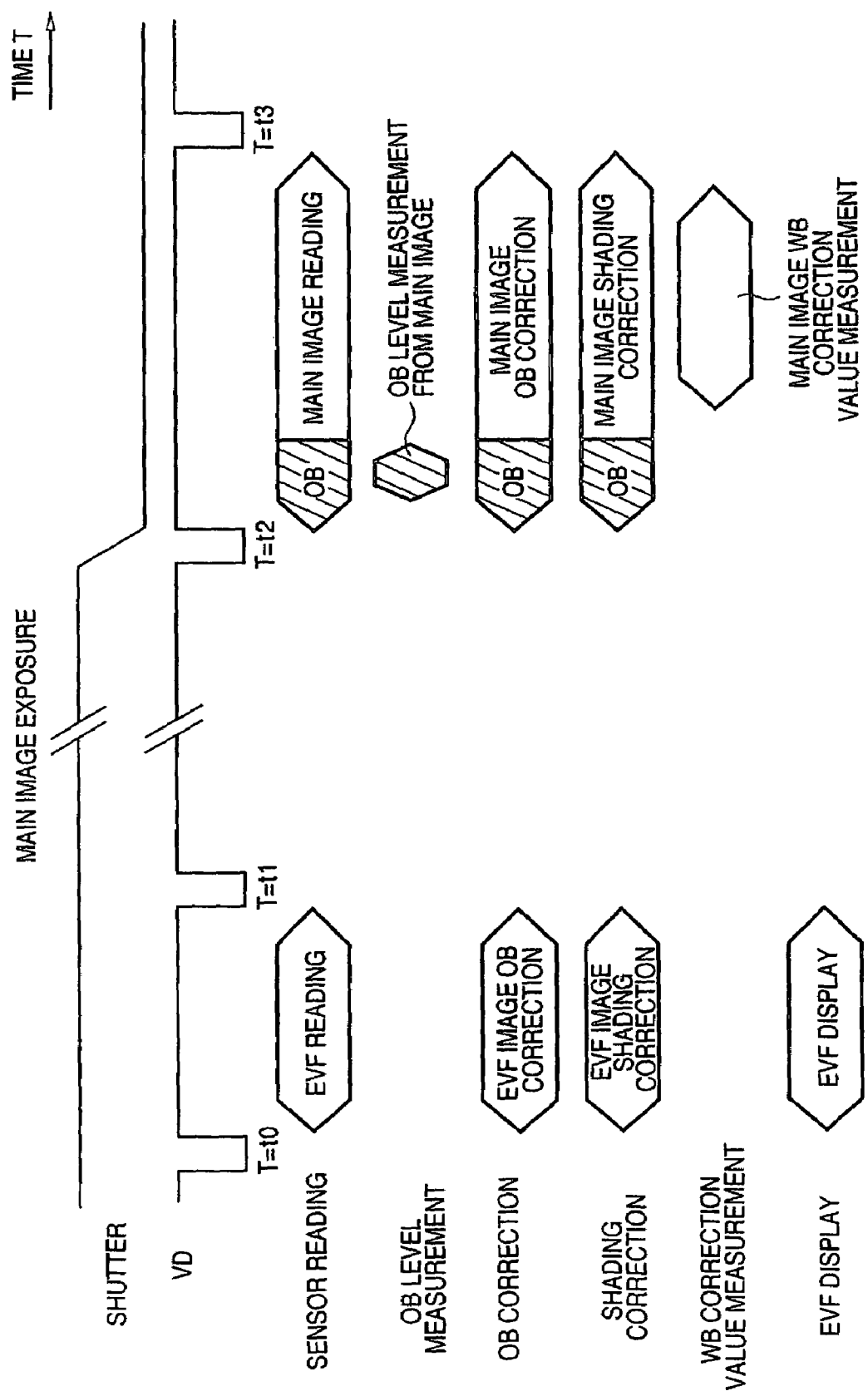
FIG. 4 is a timing chart illustrating the operation of the image signal processing apparatus according to the first embodiment of the present invention.

FIG. 4 is a timing chart illustrating the process shown in FIG. 3. When T is between t0 and t1, the apparatus performs EVF display through an EVF display process. When T is between t1 and t2, the apparatus exposes the main image. When T is between t2 and t3, the apparatus reads the main image. At this time, the OB detection circuit 70 measures the OB level from the vertical OB area shown as the dashed-line rectangle 303 shown in FIG. 3, and performs OB correction on the image signal read thereafter with the OB correction circuit 72. The OB-corrected image signal is shading corrected by the shading correction circuit 74. In addition, the apparatus measures the WB correction value from the OB level difference-corrected image signal with the WB detection circuit 76 and carries out WB correction.

Figure 5:
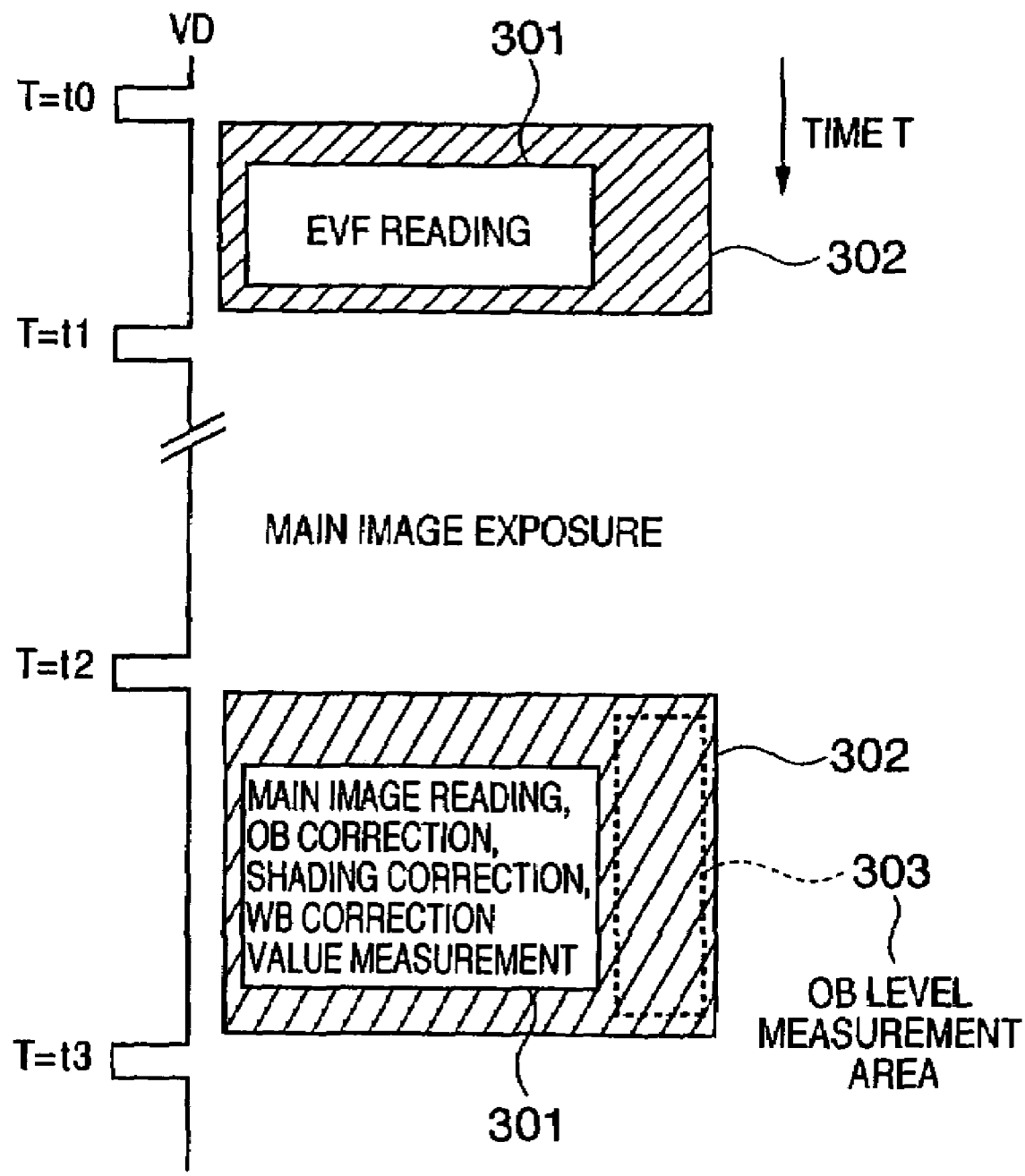
FIG. 5 is a schematic diagram for illustrating the sensor reading operation of the image signal processing apparatus according to the first embodiment of the present invention.
Figure 6:
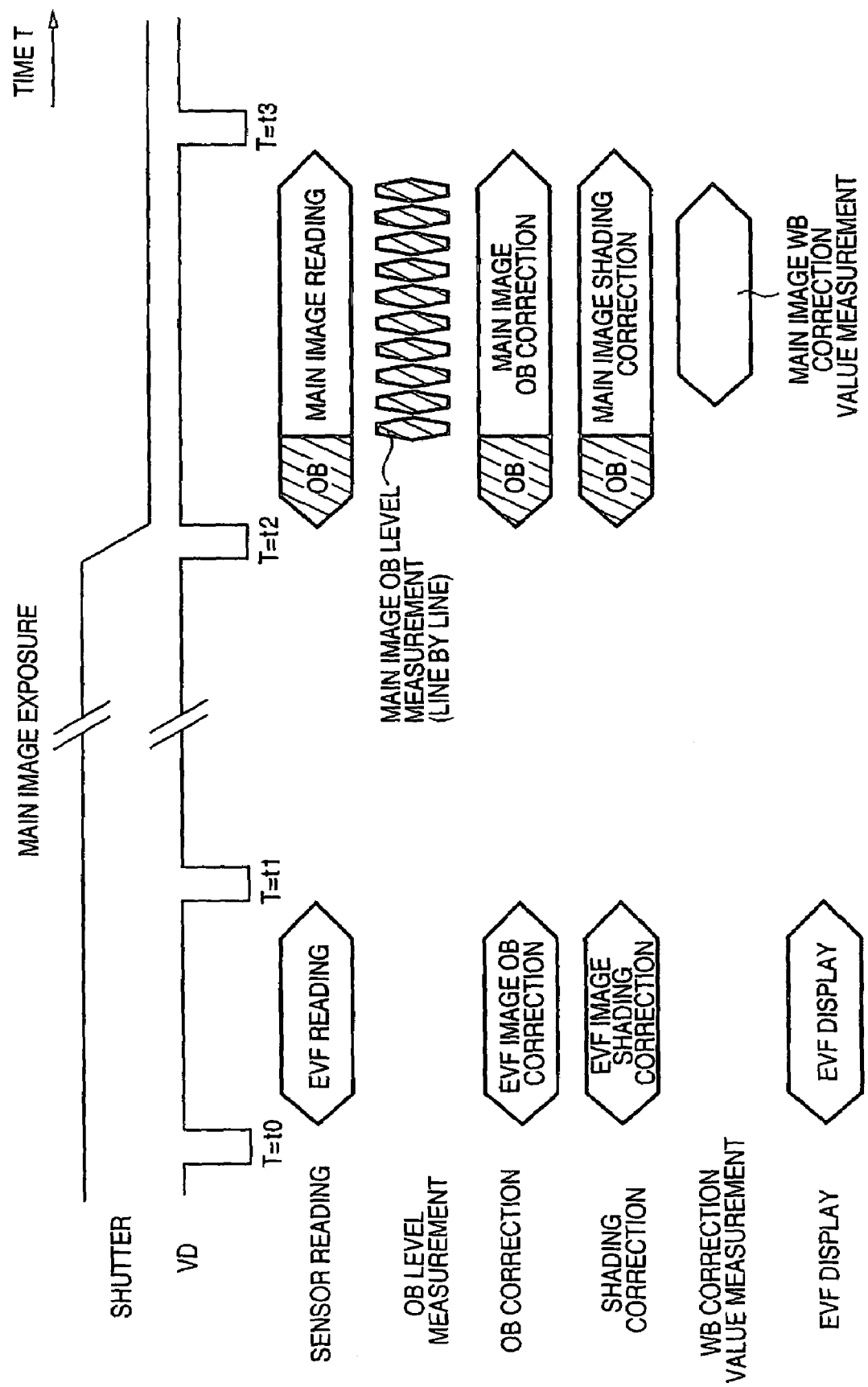
FIG. 6 is a timing chart illustrating the operation of the image signal processing apparatus according to the first embodiment of the present invention.

Although the method of utilizing the vertical OB area of the main image is described as the method of measuring the OB level, it should be noted that the present invention is not limited thereto. For example, as shown in FIGS. 5 and 6, OB correction may be implemented by measuring the OB level at each line from the horizontal OB area of the main image.

Figure 2:
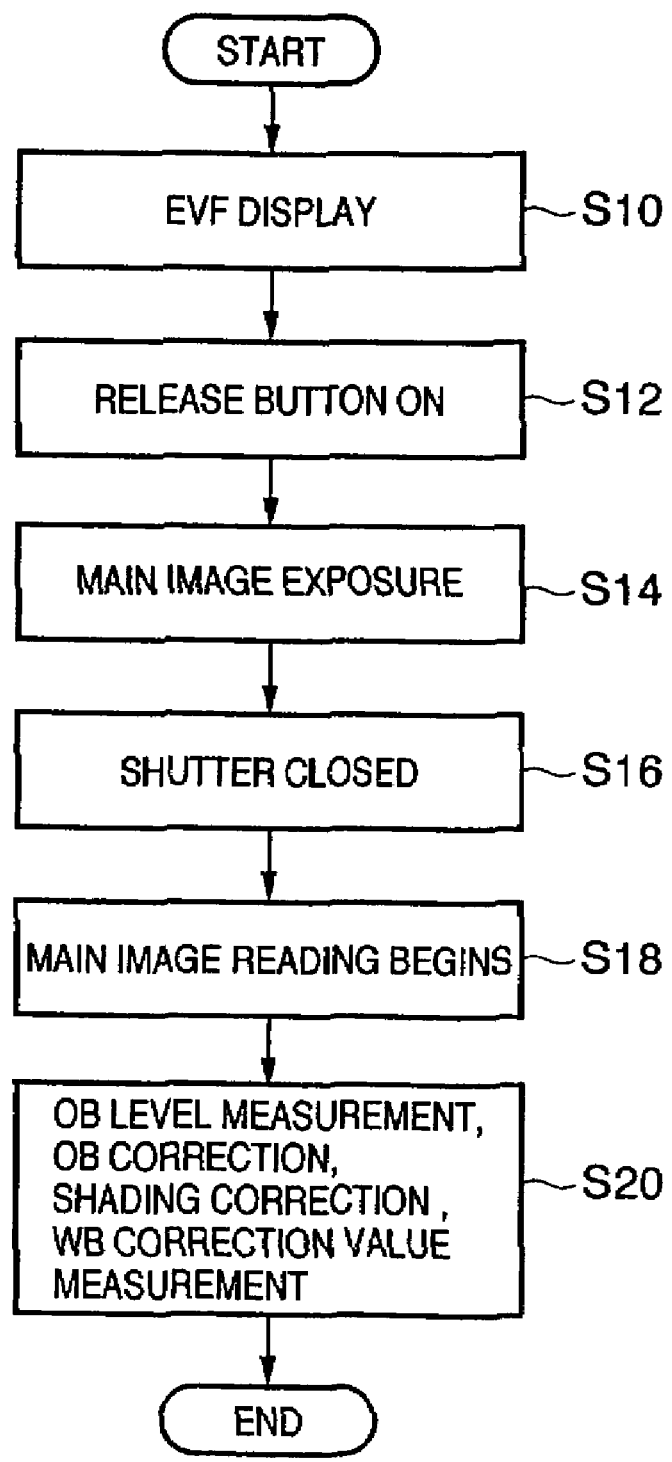
FIG. 2 is a flow chart illustrating the operation of a system control circuit of an image signal processing apparatus according to a first embodiment of the present invention.

FIG. 2 is a flow chart illustrating the control exerted by the system control circuit 90 on the processes shown in FIGS. 3 and 4.

If during operation in the EVF display mode (step S10) the release button is pressed by the user (step S12), main image sensing is begun. The main image is exposed (step S14), the shutter is closed at a predetermined shutter speed (step S16), and the image signal of an optical image of an object formed on the image sensing element 12 is read (step S18). OB level measurement, OB correction, shading correction and WB correction are performed on the read image signal by the procedures explained with reference to FIGS. 3 to 6 (step S20).

Second Embodiment

A schematic block diagram for illustrating the image signal processing apparatus of a second embodiment of the present invention is the same as FIG. 1. A description is now given of the operation of the image signal processing apparatus of the second embodiment of the present invention, using FIGS. 7 to 12.

Figure 8:
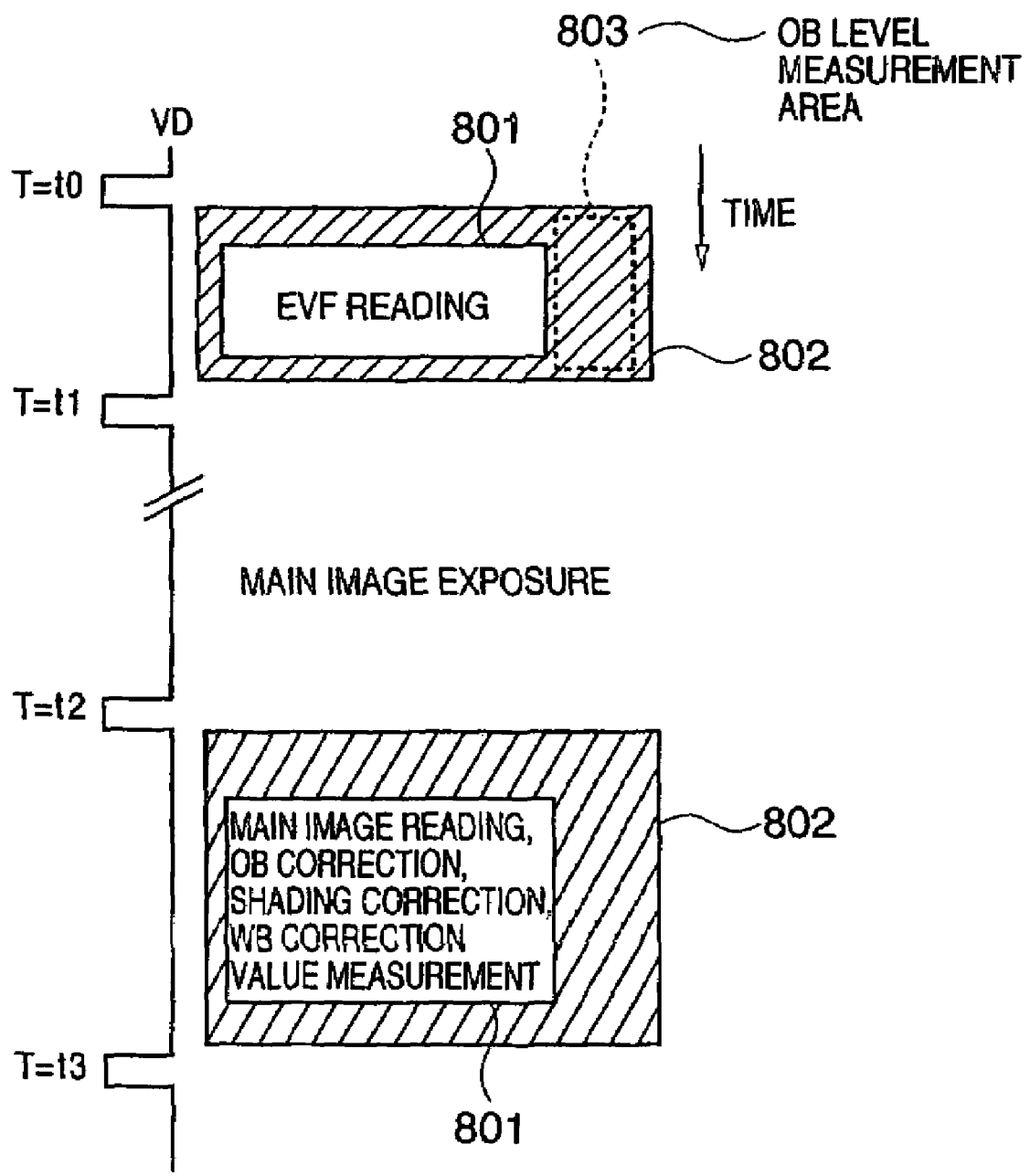
FIG. 8 is a schematic diagram for illustrating the sensor reading operation of the image signal processing apparatus according to the second embodiment of the present invention.

FIG. 8 is a diagram showing the exposed area and the OB area of a signal read from the image sensing element 12, and the shift from EVF reading to main image sensing. In the diagram, a rectangle 801 is the image signal area and an area 802 of slanted lines around the rectangle 801 is the OB area. VD is a vertical sync timing signal. The OB level of the main image is measured from the area of dashed-line rectangle 803 by the OB detection circuit 70.

Figure 9:
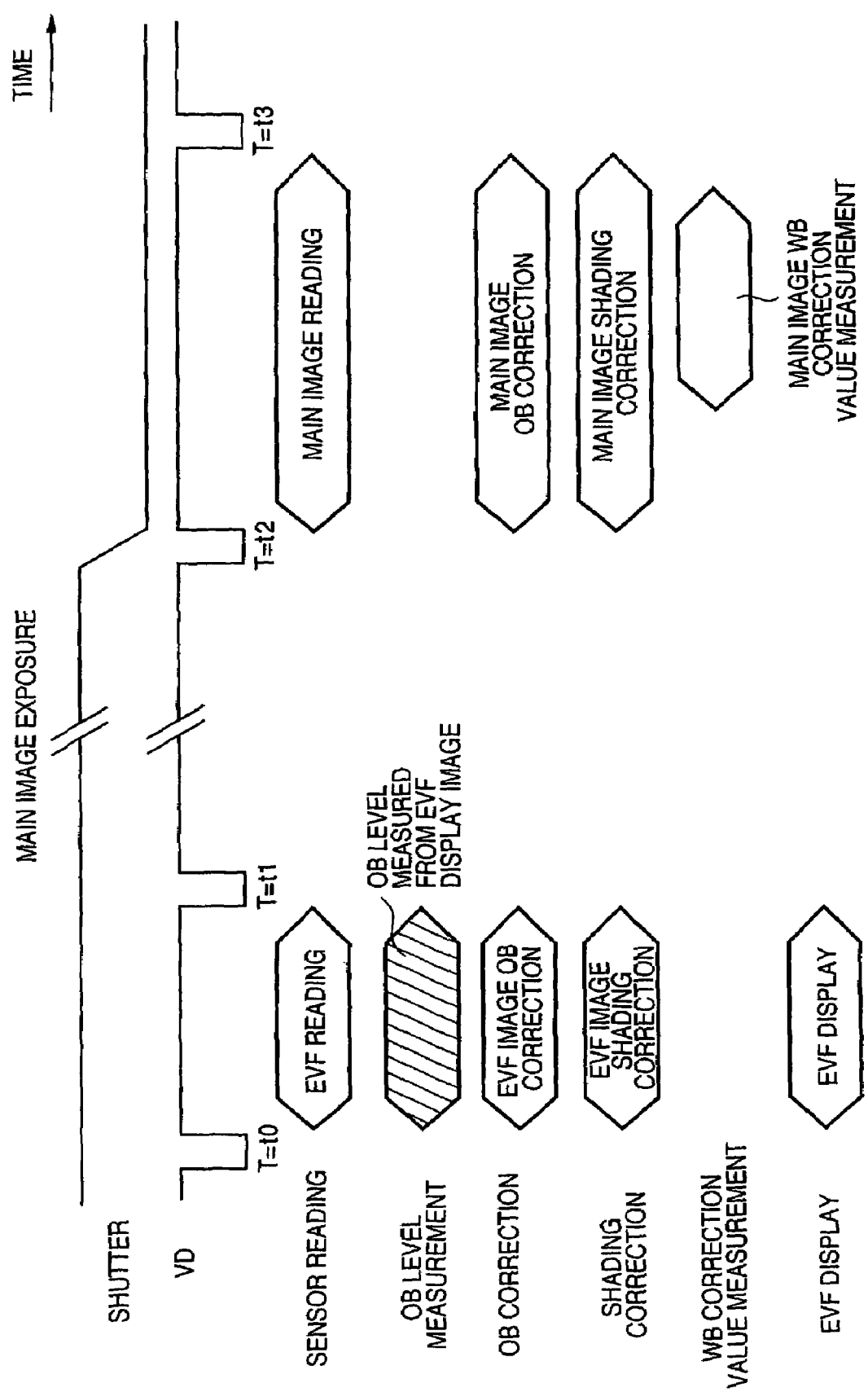
FIG. 9 is a timing chart illustrating the operation of the image signal processing apparatus according to the second embodiment of the present invention.

FIG. 9 is a timing chart for illustrating the process shown in FIG. 8. At T between t0 and t1, EVF display is performed by an EVF display process. In addition, the OB detection circuit 70 measures the OB level from the OB area shown as the dashed-line rectangle 803 shown in FIG. 8. Even during operation, the OB level is measured from the immediately preceding field and OB correction is carried out with that measured OB level, but measurement of the OB level is carried out using the OB area signal prior to OB correction.

At T between t1 and t2, the main image is exposed. At this time, the OB level of the main image is calculated from the OB level measurement obtained by the immediately preceding EVF reading using such parameters as the shutter speed and sensitivity of the EVF display process of the immediately preceding field, as well as the shutter speed and sensitivity during main image exposure. At T between t2 and t3, the main image is read. The read image signal is OB corrected by the OB correction circuit 72 using the calculated OB level. The OB-corrected image signal is shading corrected by the shading correction circuit 74. In addition, a WB correction value is measured from the OB-corrected OB image signal by the WB detection circuit 76 and WB correction is carried out.

Figure 7:
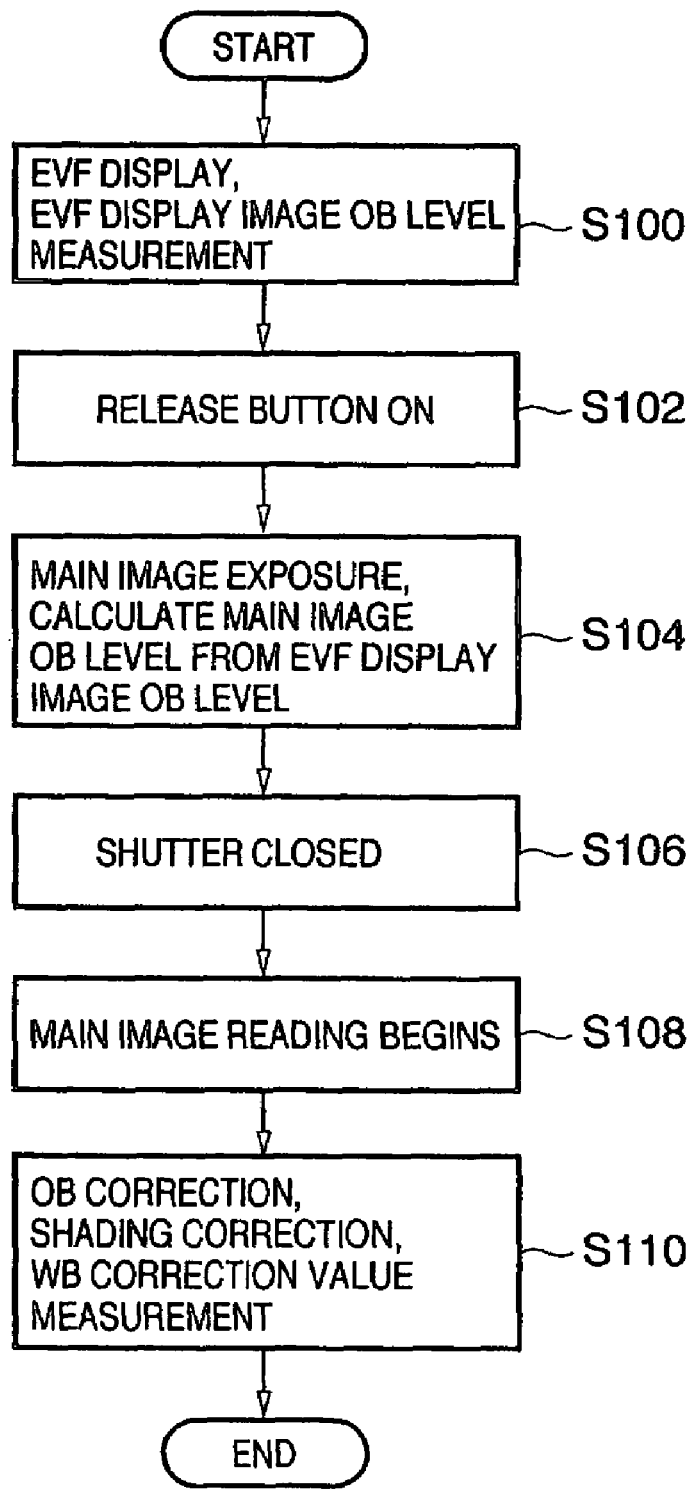
FIG. 7 is a flow chart illustrating the operation of an image signal processing apparatus according to a second embodiment of the present invention.

FIG. 7 is a flow chart for illustrating the control exerted by the system control circuit 90 over the processes shown in FIGS. 8 and 9.

If during operation in the EVF display mode (step S100) the release button is pressed by the user (step S102), main image sensing is begun. As the main image is exposed, the OB level of the main image is calculated from OB measurement of the EVF display image (step S104). Thereafter, the shutter is closed at a predetermined shutter speed (step S106) and the image signal focused on the image sensing element 12 is read (step S108). OB correction, shading correction and WB correction are performed on the read image signal by the procedures illustrated in FIGS. 8-9 (step S110).

It should be noted that the present invention is not limited to the method described above, and alternatively, as another embodiment, the OB level of the main image may be obtained in the manner described below.

Figure 11:
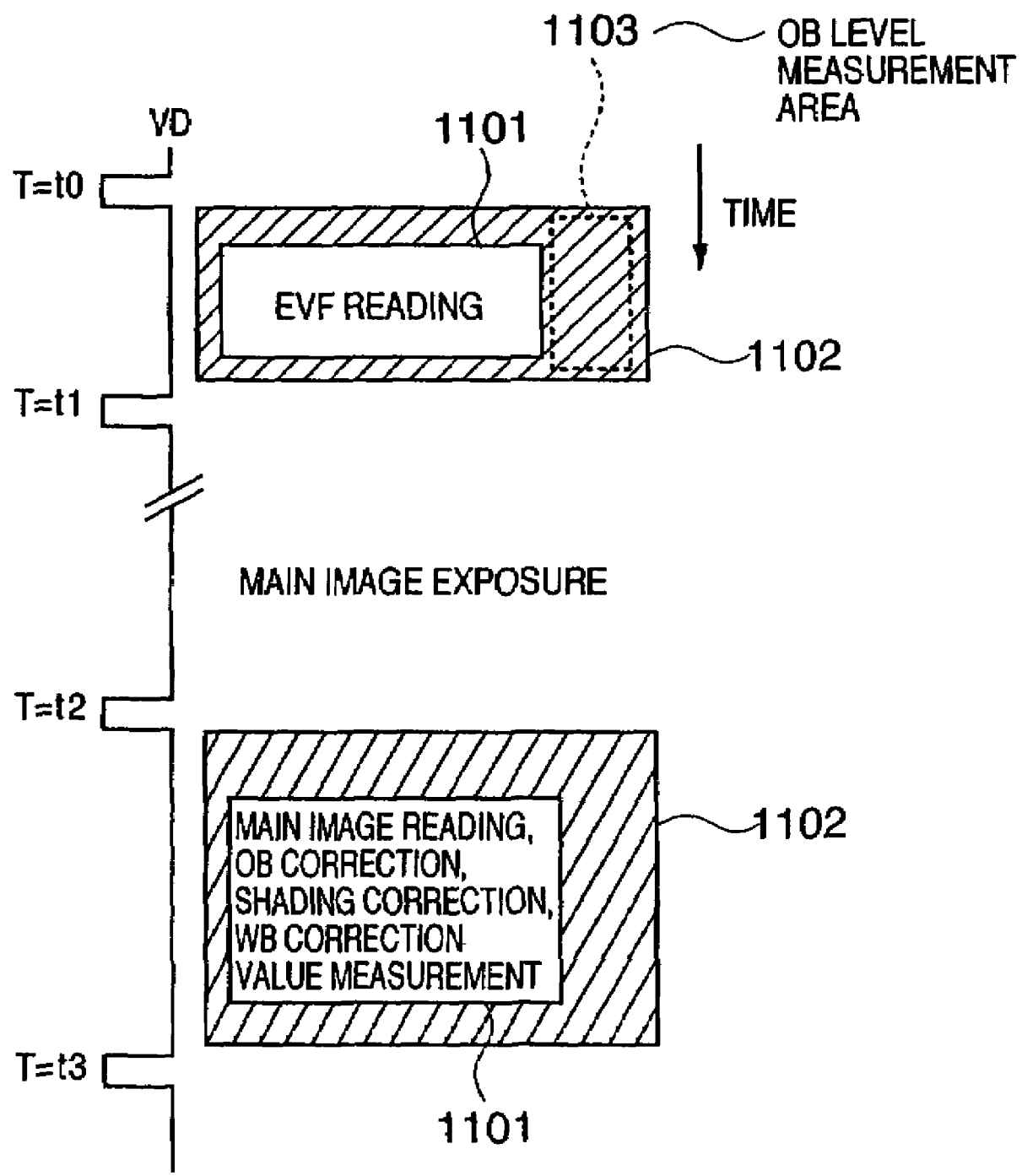
FIG. 11 is a schematic diagram for illustrating the sensor reading operation of an image signal processing apparatus according to another embodiment of the present invention.

FIG. 11 is a diagram showing the exposed area and the OB area of a signal read from the image sensing element 12, and the shift from EVF display to main image sensing. In the diagram, a rectangle 1101 is the image signal area and an area 1102 of slanted lines around the rectangle 1101 is the OB area. VD is a vertical sync timing signal. The OB level for the main image is measured from the area of dashed-line rectangle 1103 by the OB detection circuit 70.

Figure 12:
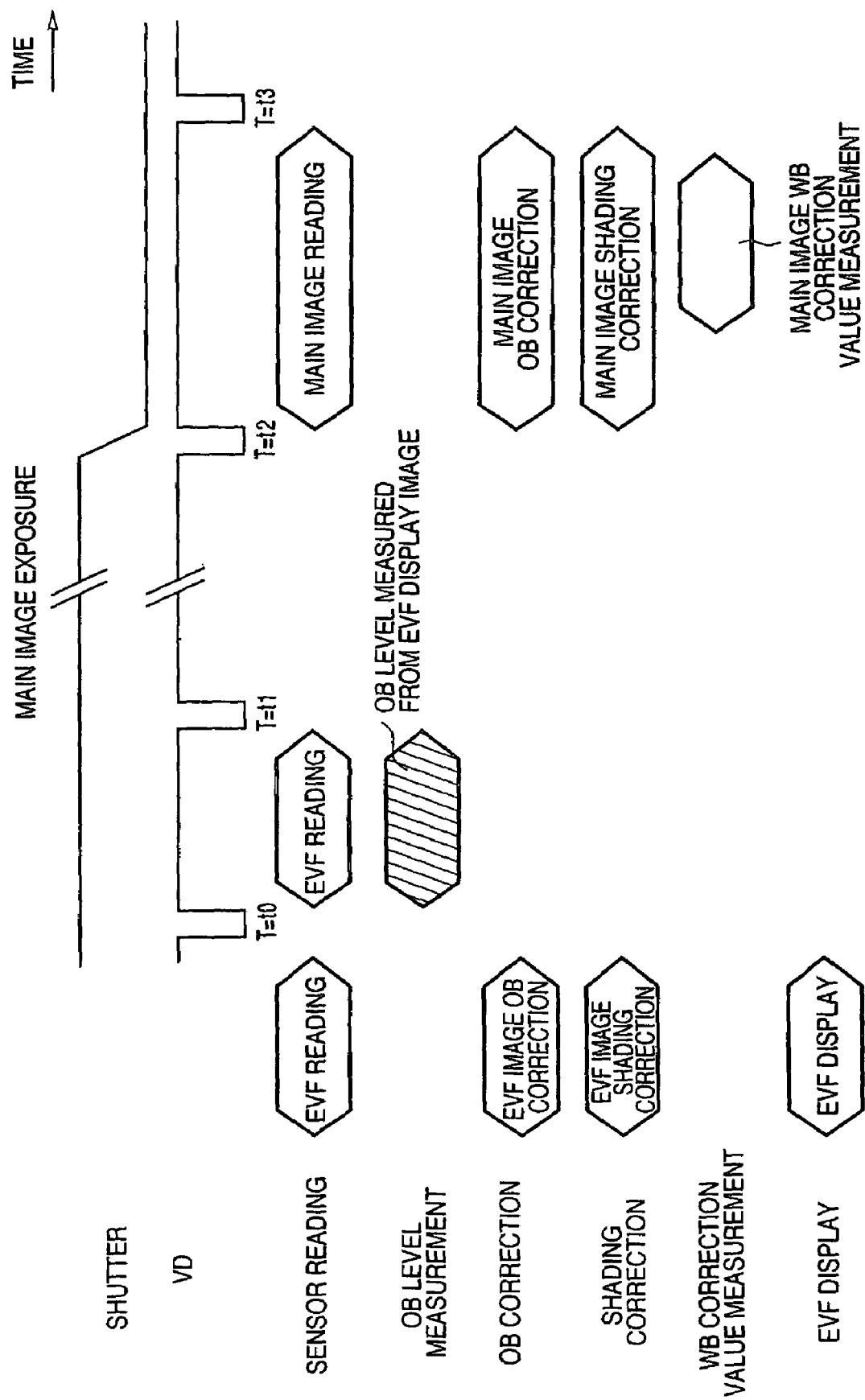
FIG. 12 is a timing chart illustrating the operation of an image signal processing apparatus according to another embodiment of the present invention.
Figure 13:
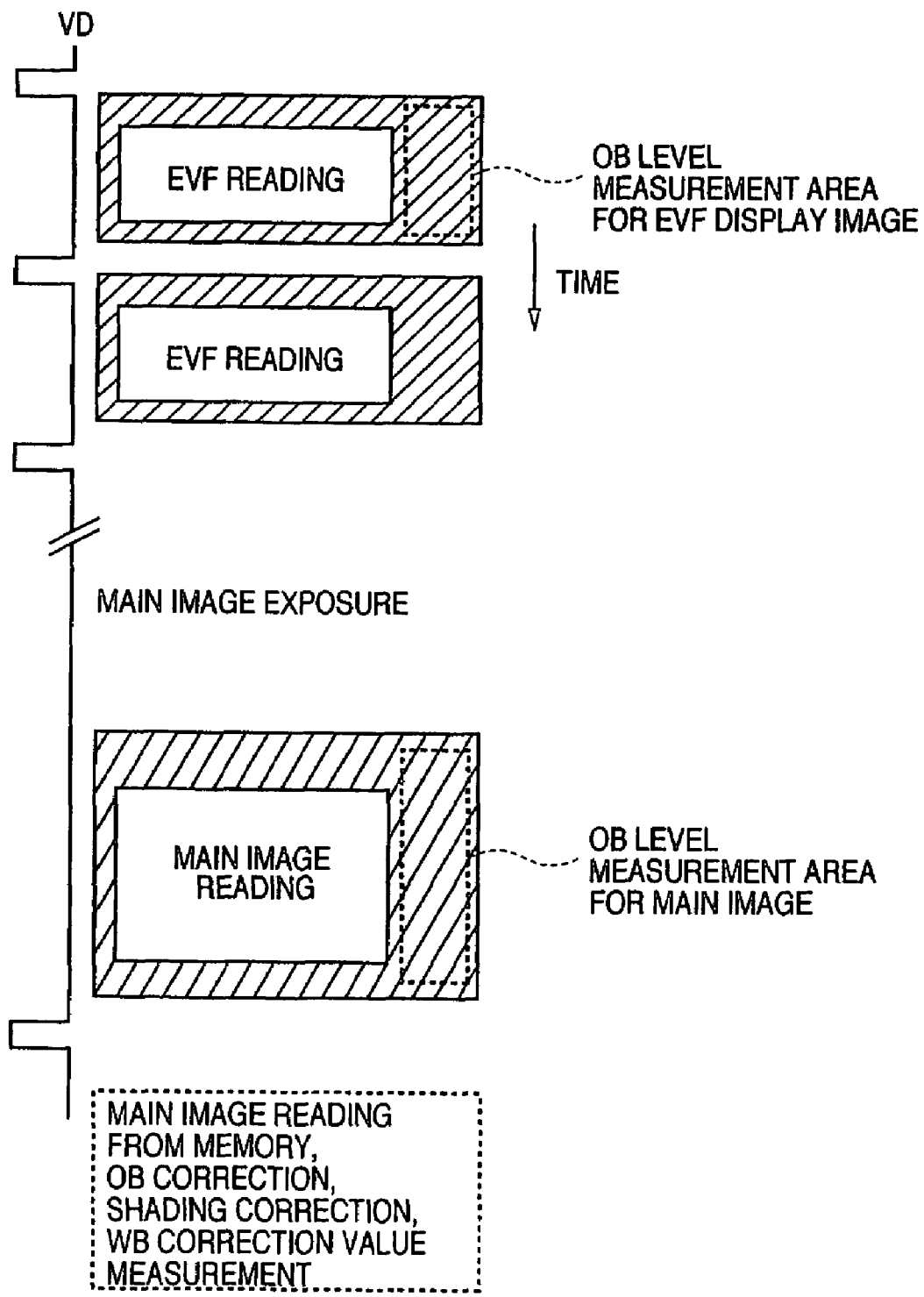
FIG. 13 is a schematic diagram for illustrating the sensor reading operation of an image signal processing apparatus of the conventional art.

FIG. 12 is a timing chart for illustrating the process shown in FIG. 11. Up to T=t0, EVF display is performed by an EVF display process. At T between t0 and t1, the shutter speed, sensitivity and other parameters are matched to main image processes and EVF reading is carried out, and the OB level is measured by the OB detection circuit 70 from the area indicated by the dashed-line rectangle shown in FIG. 11 but without EVF display. Even during EVF display, the OB level is measured from the immediately preceding EVF display image and OB correction is carried out with that measured OB level, but measurement of the OB level is carried out using the OB area signal prior to OB correction.

At T between t1 and t2, the main image is exposed. At T between t2 and t3, the main image is read. The read image signal is OB corrected by the OB correction circuit 72 using the OB level measured in the immediately preceding EVF display process. The OB-corrected image signal is shading corrected by the shading correction circuit 74. In addition, a WB correction value is measured from the OB-corrected image signal by the WB detection circuit 76 and WB correction is carried out.

Figure 10:
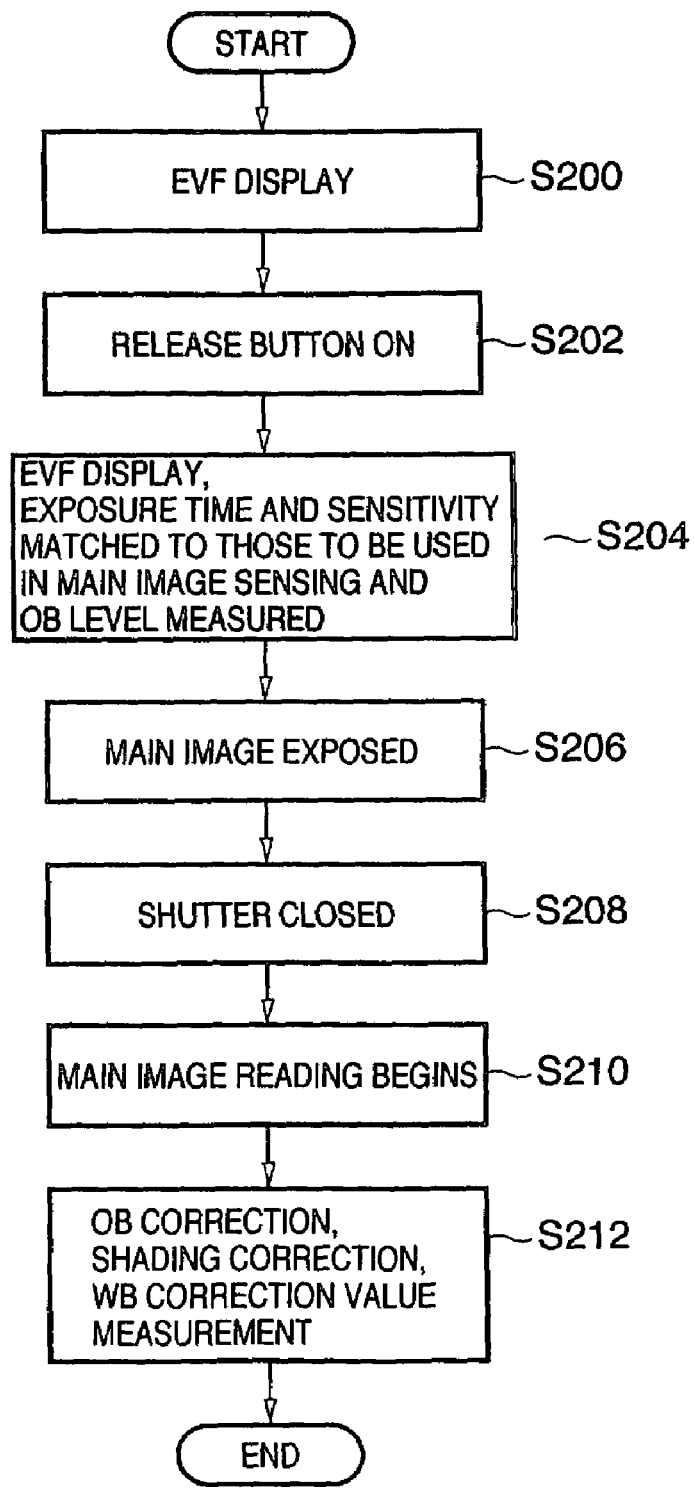
FIG. 10 is a flow chart illustrating the operation of a system control circuit of the image signal processing apparatus according to another embodiment of the present invention.

FIG. 10 is a flow chart for illustrating the control exerted by the system control circuit 90 on the processes shown in FIGS. 11 and 12.

If during operation in the EVF display mode (step S200) the release button is pressed by the user (step S202), the shutter speed, sensitivity and other parameters of EVF display operation are matched to those to be used in the main image sensing and the OB level measured (step S204). Then, main image sensing is begun. The main image is exposed (step S206), the shutter is closed at a predetermined shutter speed (step S208), and the image signal of an optical image of an object formed on the image sensing element 12 is read (step S210). OB correction, shading correction and WB measurement are performed on the read image signal by the procedures illustrated in FIGS. 11-12 (step S212).

As described above, according to the second embodiment of the present invention, OB correction is implemented during reading of the main image from the sensor, which allows OB correction of a main image to overlap with such processes as luminance shading correction, WB correction value measurement and the like, thus enabling the interval to the next image sensing to be shortened.

It should be noted that, in the second embodiment, in the event that the OB level cannot be measured in the EVF display mode, control may be arranged so as to measure the OB level from the main image as described with respect to the first embodiment.

Other Embodiments

Furthermore, the invention can be implemented by supplying a software program, which implements the functions of the foregoing embodiments, directly or indirectly, to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage medium that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-144344 filed on May 17, 2005, which is hereby incorporated by reference herein in its entirety.

What is claimed is:

1. An image signal processing apparatus comprising:
    an image sensing device that has an image signal area and an optical black area;
    an optical black level detection unit that measures an optical black level of a first image signal from an output of the optical black area in the first image signal, that represents a first image, output by said image sensing device; and
    an optical black correction unit that corrects an optical black level of a second image signal, that represents a second image, output from said image sensing device, the second image signal corresponding to pixels the number of which is larger than a number of pixels that the first image signal corresponds to,
    wherein the image sensing device generates the second image signal after generating the first image signal, and
    wherein the optical black correction unit calculates the optical black level to be used for correcting the second image signal from the optical black level of the first image signal measured by the optical black level detection unit based on at least one of shutter speed and sensitivity used when generating the second image signal, and performs optical black correction on the second image signal based on the calculated optical black level.

2. The image signal processing apparatus according to claim 1, wherein the optical black area is lengthened vertically along at least one of a left edge and a right edge of said image sensing device.

3. The image signal processing apparatus according to claim 1, wherein the optical black area is lengthened horizontally along at least one of a top edge and a bottom edge of said image sensing device.

4. An image signal processing method for processing an image signal of an image of an object output from an image sensing device having an image signal area and an optical black area, comprising:
    measuring an optical black level of a first image signal, that represents a first image, from an output of the optical black area in the first image signal output by the image sensing device;
    calculating an optical black level to be used for correcting a second image signal, that represents a second image, from the optical black level of the first image signal based on at least one of shutter speed and sensitivity used when generating the second image signal; and
    performing optical black correction on the second image signal output from the image sensing device using the calculated optical black level, the second image signal corresponding to pixels the number of which is larger than the number of pixels corresponding to the first image signal,
    wherein said image sensing device generates the second image signal after generating the first image signal.

* * * * *